3,364,214
PRODUCTION OF HEXACHLOROMELAMINE
Guenther Hamprecht, Lambsheim, Pfalz, and Rudolf Mohr, Ludwigshafen (Rhine), Germany, assignors to Badische Anilin- & Soda-Fabrik Aktiengesellschaft, Ludwigshafen (Rhine), Germany
No Drawing. Filed Dec. 14, 1965, Ser. No. 513,842
Claims priority, application Germany, Dec. 22, 1964, B 79,852
5 Claims. (Cl. 260—249.6)

This invention relates to an efficient method of making hexachloromelamine.

The manufacture of hexachloromelamine by direct chlorination of melamine in aqueous suspension according to the equation:

$$C_3H_6N_6 + 6Cl_2 \rightarrow C_3N_6Cl_6 + 6HCl$$

has hitherto offered considerable difficulty, the hydrogen chloride formed as a byproduct inhibiting the reaction. As the concentration of acid increases, the reverse reaction according to the equation:

$$C_3N_3(NH_2)_2NHCl + HCl \rightarrow C_3N_3(NH_2)_3 + Cl_2$$

is favored. Moreover a portion of the melamine is converted by the hydrogen chloride formed into the hydrochloride which can only be chlorinated with difficulty.

A number of methods has already become known which are concerned with overcoming these difficulties. The chlorination has been carried out in the presence of alkaline reacting substances in order to bind the hydrochloric acid. It is however not possible in this way to carry the chlorination beyond the trichloromelamine stage. It is also known that the chlorination may be carried out in aqueous phase while maintaining a pH value below 7, sodium hypochlorite being used as chlorinating agent. Attempts have also already been made to carry out the chlorination in the presence of such an amount of water that the concentration of hydrochloric acid in the reaction mixture after the reaction is over is less than 1 N. All these chlorinations carried out in aqueous phase have the disadvantage however that a reaction product is obtained which contains large amounts of water and which is difficult to dry owing to the easy decomposability of hexachloromelamine. This decomposition takes place not only when the substance is dried at elevated temperatures but even under mild conditions, for example in vacuo at room temperature. Decomposition may be minimized by treating the moist product in an amount of a nonpolar solvent immiscible with water equal to about 10 to 25% of its weight and drying the residue with warm air. Decomposition of the hexachloromelamine is accelerated if alkaline reacting substances remain adhering thereto from its production.

Furthermore it is known that the chlorination of melamine may be carried out in a non-aqueous solvent for chlorine, for example carbon tetrachloride, in the presence of an alkaline reacting alkali metal compound containing water of constitution. This method has the disadvantage that chlorination takes a considerable time.

It is an object of the present invention to provide a process for the production of pure hexachloromelamine by chlorination of melamine by which the said disadvantages of the prior art processes are avoided. It is a special object of the present invention to provide a process for the production of hexachloromelamine by which the said compound is obtained in high yields and in a very pure form. These objects are achieved by reacting chlorine with an aqueous suspension of melamine while stirring said suspension in the presence of an amount, sufficient to dissolve the hexachloromelamine formed, of a solvent for chlorine which is not miscible with water, separating the aqueous phase, depositing the hexachloromelamine from the solution of the water-immiscible solvent by cooling and if desired returning the mother liquor to the chlorination stage.

Chlorinated saturated and unsaturated hydrocarbons, particularly chloroform, carbon tetrachloride, dichloroethylene, trichloroethylene, tetrachloroethylene, dichloroethane, trichloroethane, tetrachloroethane, pentachloroethane and mixtures of the same are suitable as solvents. The said solvents have excellent solvent power hexachloromelamine which has marked dependence on temperature. For example the solvents listed below will dissolve in 100 g. at 40° C. the amounts of hexachloromelamine specified: chloroform 23; carbon tetrachloride 10; dichloroethane (1,2) 43; trichloroethane 28; tetrachloroethane 24; pentachloroethane 19; and trichloroethylene 54 g.

The amount of solvent used should be at least as much as is required to dissolve the whole of the hexachloromelamine formed by the reaction, while the amount of water used is preferably such as to produce an HCl concentration of less than 2.5 N at the end of the reaction.

A considerable advantage of the process according to this invention is that the reaction may be carried out not only at room temperature, i.e., temperatures from above 0° C. to 20° C., but also at higher temperatures, e.g., temperatures from 20° C. to 60° C., without appreciable decomposition of the hexachloromelamine being observed. This means that chlorination periods are considerably shorter than in prior art methods.

Chlorination may be effected either by passing in chlorine gas or by continuous or periodic addition of a saturated solution of chlorine in the said solvents. The mother liquor saturated with chlorine at low temperatures may also be used as the chlorinating agent.

The invention is illustrated by the following examples.

*Example 1*

63 g. of melamine is suspended in a mixture of 3 liters of water and 2 liters of carbon tetrachloride. Chlorine is passed at a rate of 2½ liters/minute into this mixture while stirring and cooling to a temperature of 20° to 25° C. Twenty minutes later, the whole of the melamine has dissolved and chlorination is stopped after a total of thirty minutes. The carbon tetrachloride phase is then separated from the aqueous phase and the solvent is removed in vacuo. The product obtained is dried in vacuo at 60° C. 164 g. of hexachloromelamine (equivalent to a yield of 98% of the theory on the melamine used) is obtained in the form of lemon yellow crystal needles. The product has a melting point of 156° C. and a chlorine content of 63.7%.

*Example 2*

30 g. of melamine is suspended in 1.5 liters of carbon tetrachloride, stirred and chlorine gas is passed in at the rate of 1 liter/minute for three hours thirty minutes at 15° to 20° C. The suspended melamine is then removed. The carbon tetrachloride may be evaporated completely without residue. No hexachloromelamine has been formed.

*Example 3*

40 g. of melamine is suspended in 500 ml. of water at a temperature of 5° C. 1 liter of carbon tetrachloride which has been saturated with chlorine at 5° C. is added to this suspension and the mixture, which is cooled externally with ice, is stirred. Thirty minutes later, 350 ml. of water is added and the whole heated to 35° C. After a total of ninety minutes, the carbon tetrachloride phase is separated and cooled to 0° C. so that part of the hexachloromelamine formed crystallizes out. It is filtered and dried in vacuo. 46 g. of hexachloromelamine, whose melting point is 152° C., is isolated. Another 36.5 g. of hexachloromelamine is recovered by cooling the mother liquor to a temperature of −20° C., and another 15 g. by removing the solvent in vacuo. In all a yield of 92% of the theory (with reference to melamine used) is obtained.

*Example 4*

250 g. of melamine is suspended in 2.5 liters of water and 5 liters of carbon tetrachloride and stirred. Chlorine gas is passed into the suspension. During chlorination the temperature rises from 35° to 40° C. and this temperature is maintained by cooling. After sixty minutes, the chlorination is stopped. The aqueous hydrochloric acid solution formed is separated, replaced by 2.5 liters of fresh water, and chlorine gas is again passed in. This measure is repeated twice at intervals of sixty minutes. After a total of four hours, the carbon tetrachloride phase is separated and cooled to 5° C. The product which crystallizes out is filtered off. 280 g. of hexachloromelamine is obtained.

20 g. of melamine is suspended in the mother liquor, 2.5 liters of water is added, the whole is stirred and chlorine is again passed in. The aqueous phase is renewed three times at intervals of sixty minutes. After four hours the carbon tetrachloride phase is separated, cooled to 5° C. and the deposited product is filtered off and dried. 473 g. of hexachloromelamine is obtained having a melting point of 152° C.

*Example 5*

63 g. of melamine is suspended in 750 g. of chloroform and 3 liters of water. Chlorine is passed into the mixture at a temperature of 40° C. while stirring. Thirty minutes later the chloroform solution is separated and cooled to 5° C. 37 g. of hexachloromelamine having a melting point of 156° C. is obtained. 91 g. of hexachloromelamine may be recovered from the mother liquor by evaporation. 7 g. of incompletely chlorinated product having a chlorine content of 43.9% remains suspended in the aqueous phase.

*Example 6*

A suspension of 63 g. of melamine is chlorinated and worked up as described in Example 5, but 750 g. of tetrachloroethane is used as solvent instead of chloroform. 54 g. of hexachloromelamine having a melting point of 151° C. is obtained by cooling the tetrachloroethane phase to 5° C. Another 95 g. hexachloromelamine is recovered by removing the solvent.

We claim:

1. A process for the production of hexachloromelamine which comprises reacting an aqueous suspension of melamine with chlorine while stirring in the presence of an amount of a water-immiscible solvent for chlorine which is sufficient to dissolve the hexachloromelamine formed, separating the aqueous phase, depositing the hexachloromelamine by cooling the water-immiscible solvent and separating the former from the mother liquor.

2. A process as claimed in claim 1 wherein the mother liquor is returned to the chlorination stage.

3. A process as claimed in claim 1 wherein the mother liquor is saturated with chlorine and returned to the chlorination stage.

4. A process as claimed in claim 1 wherein the chlorination is carried out at a temperature of from 20° to 60° C.

5. A process as claimed in claim 1 wherein the water-immiscible solvent is a member selected from the group consisting of chloroform, carbon tetrachloride, dichloroethylene, trichloroethylene, tetrachloroethylene, pentachloroethylene and mixtures of the same.

References Cited

UNITED STATES PATENTS

| 2,184,886 | 12/1936 | Muskat et al. | 260—249.6 XR |
| 2,472,361 | 6/1949 | Arsem | 260—249.6 XR |

FOREIGN PATENTS

| 815,682 | 7/1959 | Great Britain. |

JOHN D. RANDOLPH, *Primary Examiner.*

JOHN M. FORD, *Assistant Examiner.*